United States Patent [19]
Chandler

[11] 3,874,868
[45] Apr. 1, 1975

[54] AZIDE FOR CONTROL OF BEGGARWEED
[75] Inventor: Charles M. Chandler, Columbus, Ga.
[73] Assignee: PPG Industries, Inc., Pittsburgh, Pa.
[22] Filed: Apr. 17, 1973
[21] Appl. No.: 351,901

[52] U.S. Cl. ................................................ 71/65
[51] Int. Cl............................................ A01n 11/00
[58] Field of Search ........................................ 71/65

[56] References Cited
UNITED STATES PATENTS
3,376,126  4/1968  McConnell ............................ 71/65

OTHER PUBLICATIONS
Rodriguez-Kabana, Plant Disease Reporter, Vol. 6, No. 4, (1972) pg. 362–367.
Bell et al., Chem. Abst., Vol. 74, (1971) 86705W.

Primary Examiner—Lewis Gotts
Assistant Examiner—Catherine L. Mills
Attorney, Agent, or Firm—Mark Levin

[57] ABSTRACT

Applying azide preferably at greater than 5 pounds per acre, controls Florida beggarweed in peanut cropland.

9 Claims, No Drawings

AZIDE FOR CONTROL OF BEGGARWEED

BACKGROUND OF THE INVENTION

1. Field of the Invention

The use of sodium or potassium azide as a herbicide to control Florida beggarweed (*Desmodium tortuosum*).

2. Description of the Prior Art

Previous practices for chemical control of Florida beggarweed in peanuts have been unsatisfactory or disappointing. *Desmodium tortuosum* is a late-germinating weed. Its seeds remain dormant and escape injury when the usual pre-planting herbicide treatment (benefin or vernolate or both) is done. It has been customary, if Florida beggarweed is a problem, to use a "cracking-time" treatment i.e., one at about the time of the emergence of the peanut. Different chemicals have been used, alone or in combinations, but they have afforded at best only partial control of Florida beggarweed. Thus, it is known to use dinoseb alone, dinoseb plus 2,4-DEP, dinoseb plus diphenamid, or dinoseb plus naptalam at cracking-time, obtaining partial control of broadleaf weeds, such as *Desmodium tortuosum*. The combination of dinoseb plus naptalam is somewhat longer-lasting in its effect than the others, and it is not incompatible with the pre-planting use of benefin or vernolate. Those skilled in the art are well aware of the dangers of combining various chemical herbicides in the culture of peanuts; there have been instances of early-season crop damage from the use of dinoseb plus 2,4-DEP at cracking, after vernolate had been used earlier.

Also included in the prior art is the use of alkali-metal azide as a selective herbicide. In U.S. Pat. No. 3,376,126, there is a teaching of the use of potassium azide at rates of 2 to 100 pounds per acre, particularly to kill annual broadleaf weeds that emerge after the crops. Those skilled in the art will not understand this patent as teaching that *Desmodium tortuosum* may be selectively controlled in peanut cropland by the use of 7.5 to 15 pounds per acre of sodium or potassium azide. The patent speaks of using 2 to 100 pounds per acre for herbicidal purposes, stating that well-established crop plants often tolerate doses of potassium azide of 200 pounds per acre or more. In peanuts, doses of 15 pounds per acre of such azide give chlorosis, and doses of 100 pounds per acre would be expected to be lethal to the peanuts. Nothing in the patent gives any idea of the susceptibility of *Desmodium tortuosum* to potassium or sodium azide at rates on the order of 7.5 to 15 pounds per acre, nor does the patent discuss particular conditions taught herein that importantly influence the effectiveness of an azide treatment to kill Florida beggarweed while not substantially damaging peanuts.

The idea of applying potassium or sodium azide to peanut crop land at greater rates and at different times of year, for a different purpose, is also known. In a pending application, Ser. No. 157,028, filed June 25, 1971, it is taught that "pod rot" may be controlled by incorporating about 40 pounds per acre of sodium or potassium azide in the soil, about 2 or 3 weeks before the time of planting. This practice does not, however, have any particular effect upon Florida beggarweed. Similarly, one gains no idea of the instant invention from the teaching in U.S. Pat. No. 3,376,127 of the use of sodium or potassium azide to control selectively the aquatic weeds present in fields of rice or the like.

Attention is also directed to the article entitled "The effect of post-emergence application of potassium azide on nematode populations and development of Sclerotium rolfsii in a peanut field", by R. Rodriguez-Kabana, P. A. Backman, Henry Ivey, and L. L. Farrar, published in Vol. 6, No. 4, of the *Plant Disease Reporter*, April, 1972, Pages 362–367. This reference describes experiments that demonstrate the effect of potassium azide upon *Desmodium tortuosum*; these experiments were conducted at the suggestion of the applicant.

In peanut cropland, there has been increasing difficulty with Florida beggarweed in recent years. Chemical treatments of the kind mentioned above have been used that control rather effectively many of the other weeds that would ordinarily be present. Accordingly the Florida beggarweed has had less competition, and a greater opportunity to cause damage. It has been indicated above that measures known in the prior-art culture of peanuts have yielded, at best, only partial control of this pest.

SUMMARY OF THE INVENTION

The application of sodium or potassium azide to peanut cropland, at a rate of about 7.5 to 30 pounds per acre, and at a time between the emergence of Florida beggarweed and the time that said weeds are on the order of 1 to 2 inches tall, affords substantially complete control of Florida beggarweed in peanut cropland.

DESCRIPTION OF THE PREFERRED EMBODIMENTS

In accordance with the invention, sodium or potassium azide is applied to cropland upon which there is being grown a crop of peanuts (*Arachis hypogaea*).

As those skilled in the art will appreciate, the form that the sodium or potassium azide may take will be varied greatly, in accordance with the desires and requirements of the grower. Thus, aqueous solutions, dusts, or granules of azide on suitable inert material, for example, attapulgite clay, corn cobs, saw dust, bentonite, etc. may be used.

A granular formulation, made by absorbing the azide upon granules of inert material, is preferred. When aqueous or ammonia solutions are used, it is desirable to use a spray directed against the ground in the vicinity of the bottoms of the stems of the peanuts, taking care (as by the use of leaf-lifters or the like) to avoid insofar as is practical the application of the spray to the foliage of the plants. Applying spray to the foliage increases the likelihood of chemically burning the crop. With a granular formulation, there is less danger of such burning, particularly if the material is applied when the foliage is relatively dry, so that the granules have little or no tendency to adhere to the foliage.

The time of the application also has some importance. In Alabama and Georgia, it is usual to plant peanuts in the month of April. The best time to apply the azide to the soil for control of *Desmodium tortuosum* is within the period of June 1 to July 20. In general, it is not worthwhile to apply potassium or sodium azide before any of the Florida beggarweed has emerged from the soil, and on the other hand it is important not to apply the azide so late that a substantial portion of the beggarweed has grown to a height of 2 inches or greater, because plants of beggarweed that have become that well established may survive the herbicidal treatment. Other things being equal, it is advisable to apply the azide within the earlier part of the period mentioned above. At that time, the weed seedlings will be smaller and hence more easily killed, even with the use of lower rates of application of azide.

Another consideration is that the azide should be applied at a time sufficiently in advance of "pegging", i.e., the stage in growth at which mature flowers develop pegs that extend downward to the surface of the soil. This happens about 60 days after planting. Damage to the crop can be expected if there is a substantial amount of azide on the surface of the soil at the time of pegging. The azide (which is stable in the form in which it is applied to the soil) tends to become dissipated by contact with the soil, chiefly by the action of moisture and/or chemical reactions. The length of time that it takes for the azide to become substantially dissipated depends upon various factors such as the pH and the temperature of the soil and the availability of moisture, whether from the soil or from rain or irrigation. It is desirable to allow about ten days or more between the time of application of the azide and the expected pegging, but with favorable conditions of temperature and precipitation, the interval may be somewhat less. The time of early bloom of the peanuts or somewhat earlier is in most instances a favorable time for the treatment with azide to control *Desmodium tortuosum*.

It is convenient to discuss the rates of application in terms of equivalent pounds of potassium azide per acre. The molecular weights of potassium azide and sodium azide are such that 10 pounds per acre of potassium azide is equivalent to 8 pounds per acre of sodium azide. Speaking in terms of pounds of potassium azide or its equivalent applied to the soil, it is often necessary to apply at least about 7.5 pounds of $KN_3$ per acre in order to obtain a substantial herbicidal effect against *Desmodium tortuosum*. At rates on the order of 15 pounds per acre of $KN_3$, control of *Desmodium tortuosum* is complete; at the same time, a rate of about 15 pounds per acre or more of $KN_3$ (or equivalents) tends to cause chlorosis in the peanut plants. In most instances, the effect is relatively short-lasting, and within a few days or weeks, the crop plants recover so that it would be impossible to tell that they were ever damaged. The use of rates greater than 15 or 20 pounds per acre of $KN_3$ (or equivalent) is contraindicated on account of cost, and it is to be expected that at rates as great as 60 or 70 pounds per acre, permanent damage would be done to the crop plants.

The control of Florida beggarweed appears to afford a considerable improvement in the yield per acre of peanuts obtained. Good control of Florida beggarweed can make the difference between a yield of about 3,000 or 3,100 pounds per acre (no control of Florida beggarweed) and a yield of 3,500 to 3,800 pounds per acre (fair or good control of Florida beggarweed). At a selling price for peanuts of 11 cents per pound, an additional 400 to 500 pounds per acre makes a difference of $44 to $55 per acre, or a difference of $880 to $1,100 on a 20-acre plot. The cost of a suitable azide treatment is low enough to be worthwhile. Even if one counts upon using 15 pounds of azide per acre at $1.50 per pound, the treatment costs $22.50 per acre, compared with a yield improvement of $44 to $55 per acre. These figures are considered conservative, since the cost of the azide and the rate of application are both somewhat higher than the values likely to be met in practice, and the average selling prices of Georgia peanuts for the years 1963–1968 were consistently above 11 cents per pound.

In point of fact, the treatment to be used does not necessarily cost as much as has been indicated above. In accordance with one preferable manner of practicing the invention, the weeds that are between the rows of peanuts are destroyed by cultivation, while at the same pass of the tractor, a chemical spray is applied to the crop and the Florida beggarweeds thereamong. In many instances, the cultivation would need to be done in any event. Moreover, this reduces the amount of azide needed, and the area to be treated, to approximately one-half of what it would otherwise have been.

In a preferred manner of practicing the instant invention, the azide is applied merely by broadcasting it in granular form onto the surface of the soil, without making any effort to incorporate it in the soil. This is a distinct departure from the manner in which azides have hitherto been used in peanut cropland in accordance with prior practice, it has been considered necessary to incorporate the azide in the soil in order to obtain the desired effect of combatting soil-borne diseases. Moreover, such azide treatment was done before the planting of peanuts and at a greater rate such as 30 to 40 pounds per acre, rather than at a time when the field contains established peanut plants along with emerged *Desmodium tortuosum* plants, substantially all of which have a height of not greater than 2 inches.

The desired rate of application is on the order of 2.6 to 15.5 pounds of azide ion per acre. From this criterion, it is possible to calculate how much of the azide to use, regardless of the identity of the cation (potassium, sodium, hydrogen, calcium, ammonium) of the stable azide. This range corresponds to 5 to 30 pounds per acre of $KN_3$ or 2.67 to 16 pounds per acre of $HN_3$, or 4 to 24 pounds per acre of $NaN_3$, or 3.83 to 23 pounds per acre of $Ca(N_3)_2$.

At rates towards the lower end of the above range, the control of *D. tortuosum* is likely to be less than complete or ideal, although it may be possible in some circumstances to obtain substantially complete control at a rate near the bottom of the range, particularly if the azide is applied when the emerged seedlings of *D. tortuosum* are very small, less than ¼ to ½ inch tall. Preferably a rate of application is used that ensures at least 75% control of the *D. tortuosum*. At rates of 3.9 to 15.5 pounds of azide ion per acre, such control is virtually assured, so long as the *D. tortuosum* plants are under 2 inches tall, though some temporary crop damage is to be expected at rates greater than 7.8 pounds of azide ion per acre. Rates between 7.8 and 15.5 pounds of azide ion per acre can be used to ensure substantially complete control when the weeds are not over 2 inches tall, and they may be useful in some cases where the *D. tortuosum* is taller than 2 inches, although in that case there may be too little time between the application of azide and the time of pegging, as discussed above.

In most instances, it is desirable to act against the Florida beggarweed as early as possible. It is usually not possible to gain a good idea of the extent of the problem until the weed germinates and emerges. The sooner thereafter that action is taken, the better, because lower rates of application can be used, and the danger of having a damaging concentration of azide on the soil at the time of pegging are correspondingly diminished. If not controlled, Florida beggarweed grows to a height of 2 to 3 feet, whereas the peanuts do not achieve a height of more than about a foot. In most instances, it is desirable to apply the azide before the Florida beggarweed reaches a height of 2 inches, but it is essential that action be taken before the weeds are about 3 inches tall, since after that time, it is highly likely that either the weeds will be too well established to be killed at a rate of azide application that will not harm the peanuts, or that the time before pegging will have grown so short that there is danger of damage to the crop. If one waits until after pegging, the weeds are so well established that they cannot be killed without the use of rates of azide application that would damage the crop of peanuts.

The invention is illustrated by the following specific examples.

EXAMPLE I

Peanuts of the "Florunner" variety (*Arachis hypogaea*) were planted in Alabama in Norfolk sandy loam with a 3% slope. The plantings were in four rows (3 by 66 feet), running transverse to the slope, though only the central 50 feet were taken into account at harvest time. The field was given the pre-planting herbicide treatment that is usual for the area (1 pound per acre of benefin, followed by 1.5 pound of active ingredient per acre of alachlor and 1 pound per acre of alkanol amine salt of 4,6-dinitro-2-sec-butylphenol). Planting was done on April 26. The morning of June 23, potassium azide in granular form was applied to the plots at rates of 0, 5, 7.5, 10, 15, 20, and 30 pounds of active ingredient per acre. This coincided with the period of early bloom of peanuts. The field contained emerged weeds of *D. tortuosum* less than 2 inches tall. Each rate was represented by four replications in four randomized blocks. Weed counts were performed on July 20. Peanut plants were dug up on September 14, and yields were determined on September 22.

The results were substantially as indicated in Table I.

TABLE I

| $KN_3$ pounds per acre | No. Beggarweed plants per plot | Peanut yield, pounds per acre |
|---|---|---|
| 0 | 62 | 3,100 |
| 5 | 65 | 3,020 |
| 7.5 | 15 | 3,500 |
| 10 | 11 | 3,750 |
| 15 | 0 | 3,800 |
| 20 | 1 | 3,750 |
| 30 | 0 | 3,740 |

From the foregoing, it will be seen a substantial increase in yield was obtained with the use of potassium azide at a rate of 7.5 pounds per acre, and that such a rate yielded approximately 75% control of Florida beggarweed, which is an improvement in effectiveness, when the instant treatment is compared with other cracking-time treatments which have been used for control of Florida beggarweed. Moreover, at rates of 15 pounds per acre or somewhat above, control of Florida beggarweed is substantially complete. From the foregoing remarks, it is apparent that rates somewhat greater than 15 pounds per acre can be used, but in the foregoing test, the yield of peanuts appeared to be decreased when such greater rates were used.

EXAMPLE II

Sandy soil in Alabama was used to grow peanuts. The grower used his normal cultural practices, including deep plowing, applying vernolate and benefin with pre-plant incorporation, and applying dinoseb plus naptalam at cracking-time. Planting was done on May 15, and the azides were applied in granular form on July 10. The field contained *D. tortuosum* weeds less than 2 inches tall. The weed counts were performed on August 31, and the picking was done on September 28. Plots 12 feet wide by 100 feet long were used, and various treatments were used: 12 pounds per acre of sodium azide, 15 pounds per acre of potassium azide, 8 pounds per acre of sodium azide, 10 pounds per acre of potassium azide, and an untreated control. In the weed counts, only Florida beggarweed was counted. The results are indicated below in Table II.

TABLE II

| Counts of Florida beggarweed. Treatment | Plot 1 | Plot 2 | Plot 3 | Plot 4 | Plot 5 | Total |
|---|---|---|---|---|---|---|
| 12 pounds per acre $NaN_3$ | 0 | 0 | 0 | 1 | 0 | 1 |
| 15 pounds per acre $KN_3$ | 1 | 0 | 4 | 0 | 0 | 5 |
| 8 pounds per acre $NaN_3$ | 1 | 3 | 19 | 8 | 0 | 31 |
| 10 pounds per acre $KN_3$ | 12 | 0 | 0 | 0 | 0 | 12 |
| Control | 340 | 416 | 223 | 984 | 1264 | 3227 |

Florida beggarweed often infests cropland other than that used for peanuts, and from the teachings herein, those skilled in the art will appreciate that this weed can be selectively controlled in connection with the growing of crops other than peanuts so long as the crop is not itself so sensitive to the azide as to be affected detrimentally by the amounts used for beggarweed control. Thus, groves of citrus, plantations of pecans, fields of cotton, or orchards of peaches may be so treated. Crops having stems that are rather woody can withstand treatment with azide better than crops having tender stems. Thus, in a broader aspect, the invention is not limited to peanut cropland, but rather comprises as well the timely application of a herbicidally effective amount of azide to other cropland infested with Florida beggarweed.

While I have shown and described herein certain embodiments of my invention, I intend to cover as well any change or modification therein that may be made without departing from its spirit and scope.

I claim:

1. The method of controlling Florida beggarweed in peanut cropland which comprises applying to said cropland in advance of pegging and at a time between emergence of said weed and development of beggarweed plants about 3 inches tall an amount of a stable azide having its cation selected from the group consisting of potassium, sodium, hydrogen, calcium and ammonium effective to control said beggarweed without causing substantial permanent damage to said peanuts.

2. A method as defined in claim 1, characterized in that said amount is the equivalent of 5 to 30 pounds per acre of potassium azide.

3. A method as defined in claim 1, characterized in that said amount is the equivalent of 7.5 to 30 pounds per acre of potassium azide.

4. A method as defined in claim 2, characterized in that said azide is an alkali-metal azide.

5. A method as defined in claim 4, characterized in that said azide is sodium azide.

6. A method as defined in claim 4, characterized in that said azide is potassium azide.

7. A method as defined in claim 4, characterized in that said azide is applied in granular form.

8. A method of killing Florida beggarweed in cropland infested with said beggarweed that comprises applying a stable azide having its cation selected from the group consisting of potassium, sodium, hydrogen and ammonium to said cropland at a time between emergence of said weed and development of beggarweed plants about 3 inches tall in an effective herbicidal amount of between 2.6 and 15.5 pounds of azide ion per acre.

9. A method as defined in claim 8, characterized in that said azide is applied in granular form.

* * * * *